United States Patent [19]

Joo

[11] 4,099,394
[45] Jul. 11, 1978

[54] BICYCLE CABLE LOCKING DEVICE

[76] Inventor: Laszlo Joo, 3002 W. Kilbourn Ave., Milwaukee, Wis. 53208

[21] Appl. No.: 801,487

[22] Filed: May 31, 1977

[51] Int. Cl.² .......................... E05B 71/00; B62H 5/00
[52] U.S. Cl. .......................................... 70/233; 70/49; 70/54; 280/289 L
[58] Field of Search .................... 70/18, 30, 49, 53, 54, 70/55, 56, 233, 234, 235, 236; 280/289 A, 289 L

[56] References Cited

U.S. PATENT DOCUMENTS

| | | | |
|---|---|---|---|
| 2,451,100 | 10/1948 | Lecompte | 70/49 X |
| 3,748,876 | 7/1973 | Mathews | 70/234 UX |
| 3,800,570 | 4/1974 | Kaplan | 70/54 |
| 3,805,564 | 4/1974 | Velardo | 70/54 X |
| 3,910,081 | 10/1975 | Pender | 70/233 X |
| 3,922,894 | 12/1975 | Johnson | 70/18 |
| 3,950,972 | 4/1976 | Bleier et al. | 70/49 X |
| 3,990,182 | 11/1976 | Linder | 70/56 X |
| 4,028,916 | 6/1977 | Pender | 70/49 X |
| 4,033,160 | 7/1977 | Mima | 70/233 |
| 4,044,577 | 8/1977 | Horlacher | 70/234 |

FOREIGN PATENT DOCUMENTS

| | | | |
|---|---|---|---|
| 866,462 | 5/1941 | France | 70/234 |
| 539,919 | 12/1931 | Fed. Rep. of Germany | 70/234 |
| 238,250 | 6/1945 | Switzerland | 70/233 |
| 818,228 | 8/1959 | United Kingdom | 70/30 |

Primary Examiner—Roy D. Frazier
Assistant Examiner—Thomas J. Holko
Attorney, Agent, or Firm—Wheeler, Morsell, House & Fuller

[57] ABSTRACT

A locking device for a bicycle employs a large diameter flexible steel cable such as a 7/16 inch diameter cable. A storage reel for the cable is hinged to the bike frame and sized to contain loops of the cable when not in use. The storage reel desirably fits partially within the outline of the bicycle frame between the bicycle seat and the steering column to minimize interference with the use of the bicycle. One end of the cable is secured to the reel and the free end can be wrapped around a structure to prevent theft of the bicycle and then inserted in a socket mounted on the bicycle fork. A plug on the end of the cable interfits in the socket and registrable apertures on the tube socket and the plug enable a padlock shackle to be inserted through the apertures to secure the free end of the cable to the bicycle.

4 Claims, 6 Drawing Figures

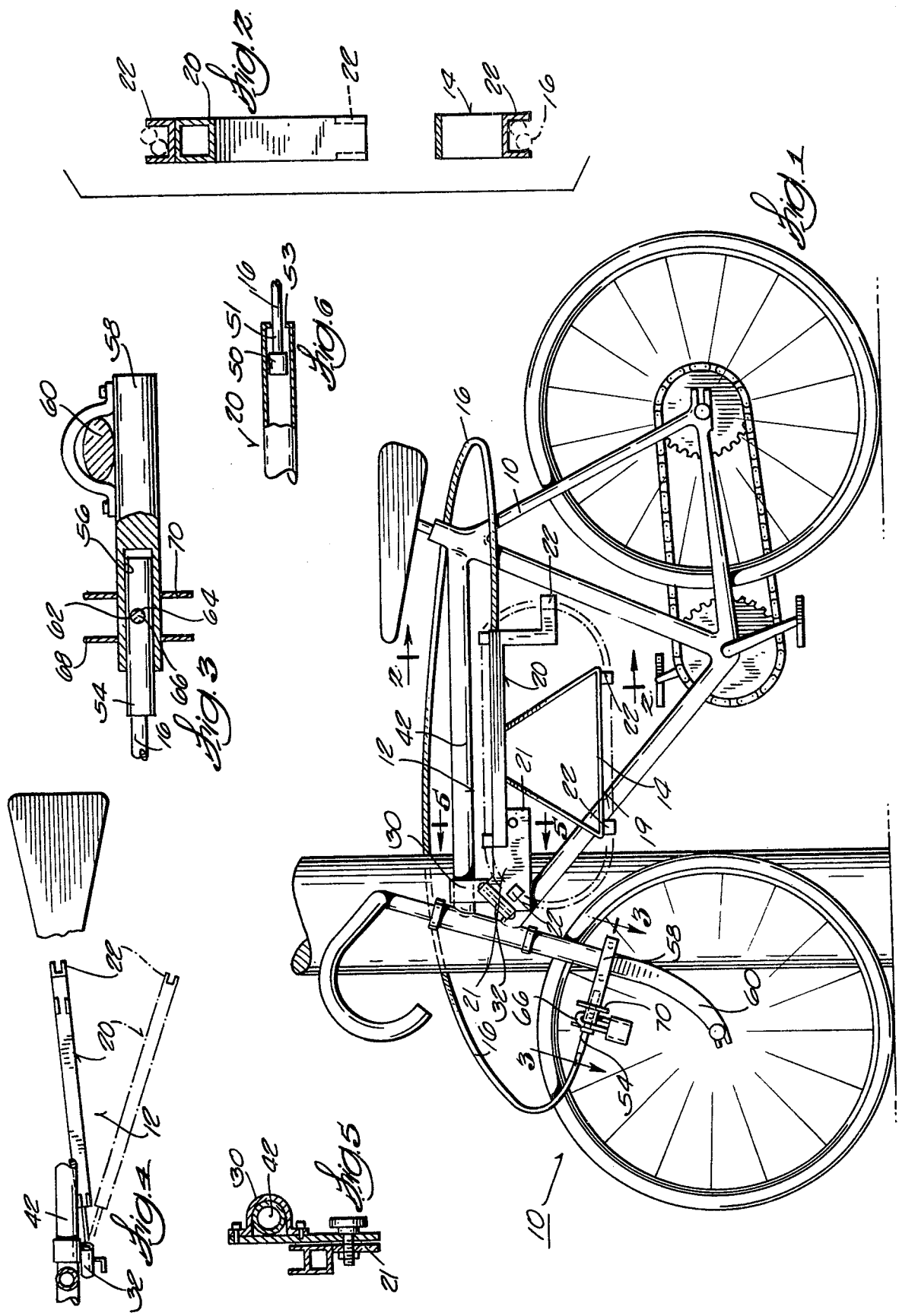

BICYCLE CABLE LOCKING DEVICE

BACKGROUND OF THE INVENTION

Various types of chains and cables have been employed as security devices for locking bicycles to prevent theft. In order to facilitate carrying of the chains or cables on the bicycle, relatively small diameter cable and small chain links have been employed. Small diameter cable can be cut with bolt cutters. Large diameter cable is very difficult to cut but the large cable cannot be formed into tight loops, and thus the large diameter cable is awkward to store on a bicycle when not in use. Patents illustrative of cable locking devices are U.S. Pat. Nos. 3,800,575; 3,910,602; 3,981,166; and 3,950,972. These patents show various arrangements for storing small diameter cable. A locking cable desirably has a length sufficient to be looped through both wheels and a fixture. A cable at least 7 feet long is required for this purpose. Hence there is a storage problem for the cable when not in use, particularly with heavy cable which is not coilable into small loops. Thus a small rotatable reel as shown by the prior art is not appropriate.

SUMMARY OF INVENTION

The invention provides a storage reel for a large diameter bicycle cable such as ⅜ or 7/16 inch in diameter which in one embodiment is hinged to the bike frame and located between the steering column or steering fork and the seat post. The hinge enables the reel to be swung outwardly from the frame for easy access. The storage reel has outwardly open channel members about which the cable can be wrapped around when the cable is not in use. One end of the cable is secured to the reel and the free end includes a plug which is received in a socket mounted on a clamp which is fastened to the fork of the front wheel. Thus the cable can be looped around a structure to prevent theft of the bicycle.

Further objects, advantages and features of the invention will become apparent from the following disclosure.

DESCRIPTION OF DRAWINGS

FIG. 1 is a side elevational view of a bicycle employing the locking device of the invention.

FIG. 2 is an enlarged view taken along line 2—2 of FIG. 1.

FIG. 3 is an enlarged view taken along line 3—3 of FIG. 1 showing the connection of the free end of the cable to a bike fork clamp.

FIG. 4 is a fragmentary top view on reduced scale of a bicycle and the locking device of the invention.

FIG. 5 is a view along line 5—5 of FIG. 1 showing a locking bolt for holding the reel in the folded position.

FIG. 6 is an enlarged fragmentary section view of the cable end fastened to the storage reel.

DESCRIPTION OF PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

In the drawings, a conventional bicycle 10 is provided with the locking device 12 of the invention which includes a reel 14 and a cable 16. The cable 16 is desirably braided or wound steel cable having a diameter of approximately 7/16 inch. Cable of lesser diameter can be employed, but the smaller diameter cable is more easily cut.

The reel 14 is formed by an upper tube 20 and a triangular strut 19 which is welded to the tube 20. The tube 20 is connected by welds to a hinge plate 21. Clips or short lengths of U-shaped channel 22 are spaced around the reel frame composed of the tube 20, strut 19 and hinge plate 21 to confine wraps of the cable 16. The hinge plate 21 is connected to a mounting clamp 30 by hinge pin 32. The clamp 30 loops around tube 42 of the bike frame. The hinge connection affords displacement of the reel from a position partially within the outline of the bike frame as shown in full lines in FIG. 4 to an outwardly displaced position swung away from the bike frame as shown in broken lines in FIG. 4 for access to the reel for winding and unwinding of the cable 16 on the reel. The reel 14 is maintained in the folded position partially within the bike frame by a lock bolt carried by the clamp 30 and threadably received in an aperture in hinge plate 21 (FIG. 5).

One end of the cable 16 is secured to the reel 12. In the disclosed construction (FIG. 6), the cable 16 is provided with a plug 50 on cable end 51 which enables the cable 16 to be slid within the tube 20 to take up slack and minimize the size of the loop around a bike stand, post, or other fixture. The plug 50 is secured in the tube by a washer 53 welded to the end of the tube 20. The free end of the cable is provided with a plug 54 which is received in a socket 56 which is part of a bracket 58 clamped to the fork leg 60, as best shown in FIG. 3. The plug 54 and socket 56 are provided with registrable apertures 62, 64 to receive the shackle 66 of a padlock. The socket 56 can be provided with fins or shields 68, 70 on opposite sides of the apertures 62, 64 to prevent access to the shackle 66 with a saw or bolt cutter. Various of the parts employed in the locking device are of hardened steel to prevent disengagement of the cable from the looped locking position. When not in use, the cable 16 is trained around the reel 14 as shown in broken lines in FIG. 1. The reel and cable thus do not interfere with normal use of the bicycle. The free end of the cable can be secured to a clip on the reel 14 when not in the socket 56.

Some of the advantages of the invention can be obtained with a reel which is not mounted with a hinge to the bike frame but merely clamped to the frame.

What I claim is:

1. A bicycle locking device comprising a storage reel, connecting means for connecting said storage reel to a bike frame with said reel being located between the front wheel and seat, a flexible cable, first means for securing a first end of said cable to said reel, and second means for securing the other end of said cable to said bike frame, said second means comprising a socket adapted to be clamped to the bike frame, and said second means further including a plug on said second cable end receivable in said socket aperture and registrable openings on said plug and said socket to receive the shackle of a lock and wherein said connecting means for said storage reel comprises hinge means, which means affords movement of said reel relative to the bike frame between a swung out access position and a storage position partially within the outline of a bike frame.

2. A locking device in accordance with claim 1 wherein said reel includes a tube and means for securing the second cable end in said tube to provide sliding movement of said cable end within said tube.

3. A bicycle locking device in accordance with claim 1 in combination with a bicycle having a frame tube between the seat post and front wheel fork and wherein said means for connecting said storage reel to said bike frame comprise a hinge connected to said horizontal tube, and means connected between said reel and said bicycle frame tube to secure said reel in the storage position.

4. A bicycle locking device in accordance with claim 1 including shields on said socket on opposite sides of said opening to prevent cutting access to said shackle.

* * * * *